United States Patent [19]

Ito

[11] Patent Number: 4,952,039
[45] Date of Patent: Aug. 28, 1990

[54] MACRO-ADAPTED ZOOM LENS SYSTEM CAPABLE OF HIGH ZOOM RATIO WHILE COVERING WIDE ANGLES

[75] Inventor: Takayuki Ito, Tokyo, Japan

[73] Assignee: Asahi Kogaku Kogyo Kabushiki Kaisha, Tokyo, Japan

[21] Appl. No.: 112,171

[22] Filed: Oct. 26, 1987

[30] Foreign Application Priority Data

Oct. 24, 1986 [JP] Japan .................................. 61-253137
Jul. 23, 1987 [JP] Japan .................................. 62-184118

[51] Int. Cl.$^5$ ............................................. G02B 15/22
[52] U.S. Cl. ..................................... 350/428; 350/427
[58] Field of Search ......................... 350/423, 427, 428

[56] References Cited

U.S. PATENT DOCUMENTS

| | | | |
|---|---|---|---|
| 4,501,475 | 2/1985 | Fujita et al. | 350/427 |
| 4,657,351 | 4/1987 | Mori | 350/427 |
| 4,708,443 | 11/1987 | Goto et al. | 350/427 |
| 4,770,511 | 9/1988 | Yonezawa et al. | 350/428 |

FOREIGN PATENT DOCUMENTS

| | | |
|---|---|---|
| 54-139724 | 10/1979 | Japan . |
| 55-153909 | 1/1980 | Japan . |
| 57-4018 | 1/1982 | Japan . |
| 58-143312 | 8/1983 | Japan . |
| 58-202416 | 11/1983 | Japan . |
| 58-211117 | 12/1983 | Japan . |
| 58-211118 | 12/1983 | Japan . |
| 59-52214 | 3/1984 | Japan . |

Primary Examiner—Scott J. Sugarman
Attorney, Agent, or Firm—Sughrue, Mion, Zinn, Macpeak & Seas

[57] ABSTRACT

In a macro-adapted zoom lens system capable of high zoom ratio and which covers wide angles, there is disclosed a lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end. The focusing is normally achieved by means of the first lens group and, when closeup shooting is to be made at a nearer distance, the first lens group is fixed at the telephoto end but the second lens group is displaced toward the object while at least one of the third and fourth lens groups are displaced independently so as to increase the distance between the third and fourth lens groups.

18 Claims, 4 Drawing Sheets

MACRO-ADAPTED ZOOM LENS SYSTEM CAPABLE OF HIGH ZOOM RATIO WHILE COVERING WIDE ANGLES

BACKGROUND OF THE INVENTION

The present invention relates to a macro-adapted zoom lens system capable of high zoom ratio and which covers wide angles. More particularly, the present invention relates to a macro-adapted zoom lens system for a 35 mm still camera that comprises a positive, a negative, a positive and a positive lens group and which can be adjusted from the wide-angle position to the telephoto end.

Conventional zoom lens systems capable of high zoom ratio and which cover wide angles achieve focusing by two methods. The one method, which has been known for many years and may be described as the old method, depends on the first lens group for focusing purposes. The other method, which has been made known in recent years and hence may be named a new method, is applicable to a five-group type zoom lens system comprising a positive, a negative, a positive, a negative and a positive lens group. In this new method, focusing is achieved either by displacing the first and second lens groups in unison, or by displacing the third, fourth and fifth lens groups in unison.

In focusing by the new method, it is fairly easy to reduce the minimum distance at which closeup shooting can be made. However, if the old method of focusing is directly applied to a zoom lens system capable of high zoom ratio and which covers wide angles, the quantity of light admitted at the widest angle position (i.e., at the shortest focal length) is so much decreased that it is very difficult to reduce the minimum distance at which closeup shooting can be made.

As mentioned above, zoom lens systems that employ the old method to achieve focusing have the disadvantage that the minimum distance at which closeup shooting can be made is rather long, so in order to provide for closeup shooting at a nearer distance, various macro-adapted systems have been invented and used in practice. Such macro-adapted lens systems include:

(i) a system in which all the lens groups used are advanced to achieve zooming;

(ii) a system in which the first lens group is advanced from the shortest-distance shooting position at the narrow angle mode (or including the middle-angle mode); and (iii) a system in which part of the lens groups such as, for example, the second lens group, is advanced toward the object side at the narrow- angle end.

Figure 1:
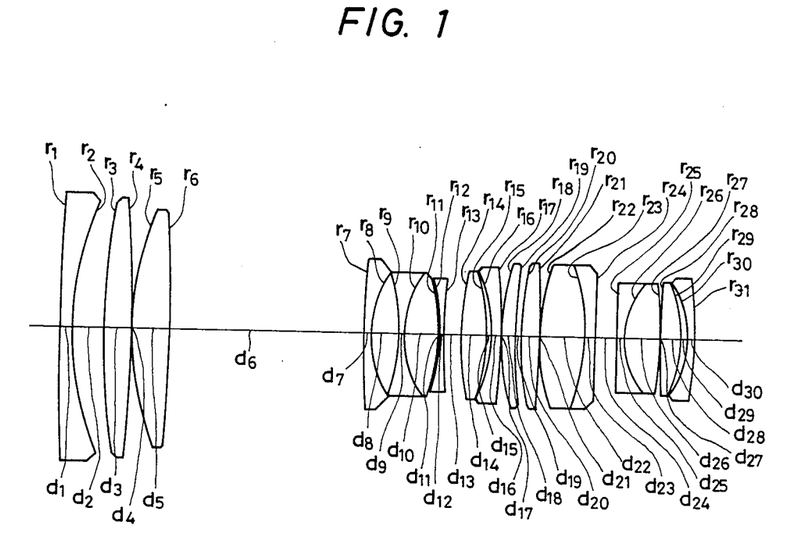
FIG. 1 is a simplified cross-sectional view of the lens system of the present invention at the narrow-angle end when it is focused for an object at infinity.
Figure 2:
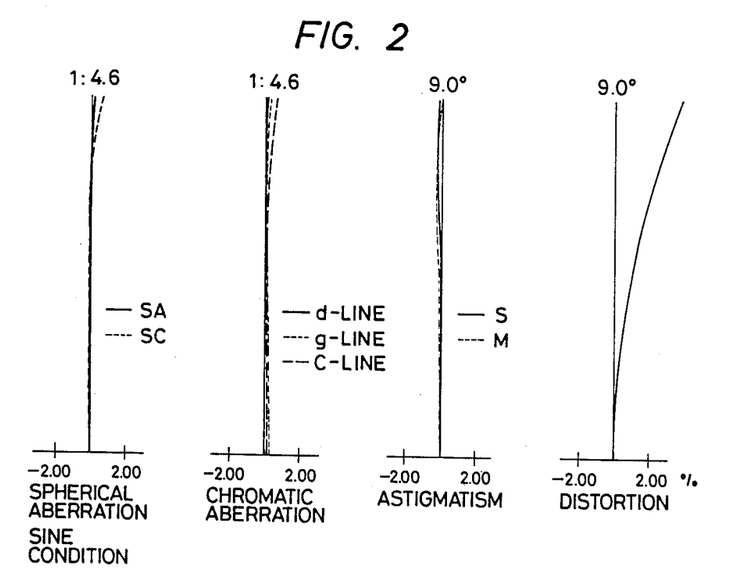
FIG. 2 is a graph plotting the aberrational curves obtained when the lens system is at the telephoto end and focused for an object at infinity.
Figure 3:
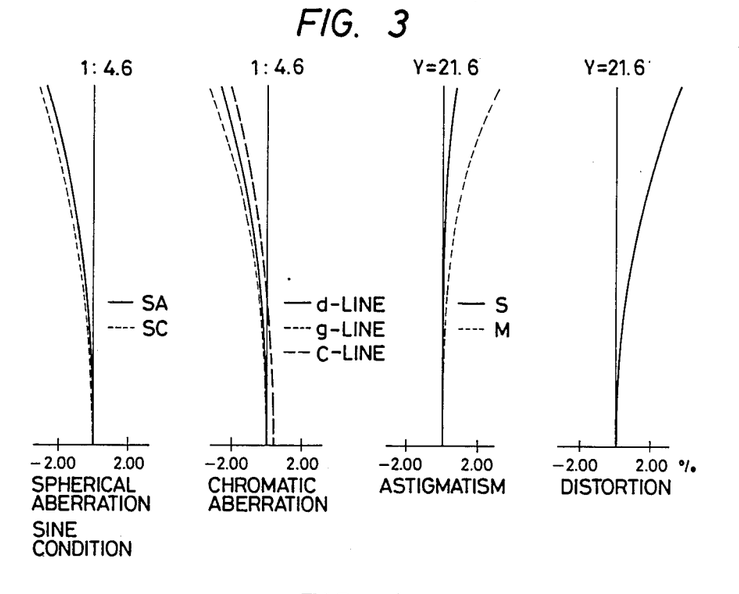
FIG. 3 is a graph plotting the aberrational curves obtained when an image magnification in macro mode (m) of $-\frac{1}{4}$ (object-to-lens distance of about 0.8 m) is attained by advancing the first lens group from the position where the minimum distance at which closeup shooting can be made is 1.8 m.
Figure 4:
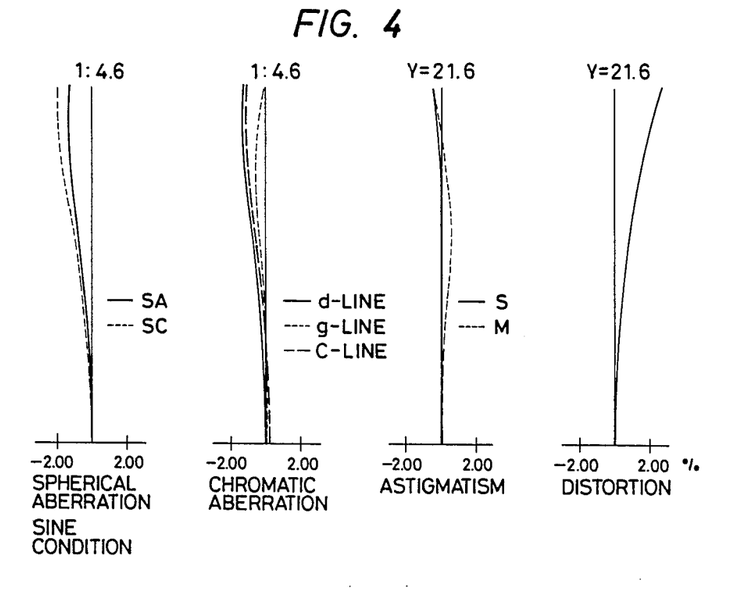
FIGS. 4, 5, 6, 7 and 8 are graphs plotting the aberrational curves obtained in Examples 1, 2, 3, 4 and 5, respectively, when an image magnification in macro mode (m) of $-\frac{1}{4}$ (object-to-lens distance of about 0.5 m) is attained by lens displacement according to the present invention from the position where the minimum distance at which closeup shooting can be made is 1.8 m.
Figure 5:
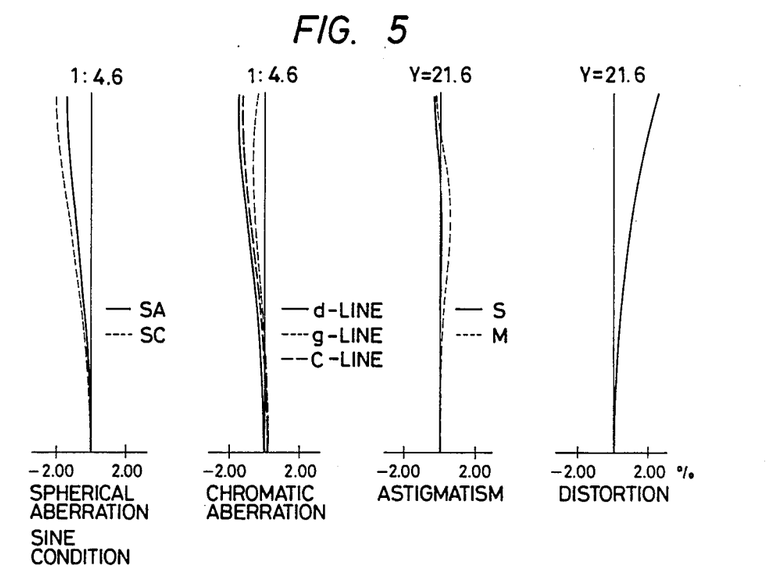
Figure 6:
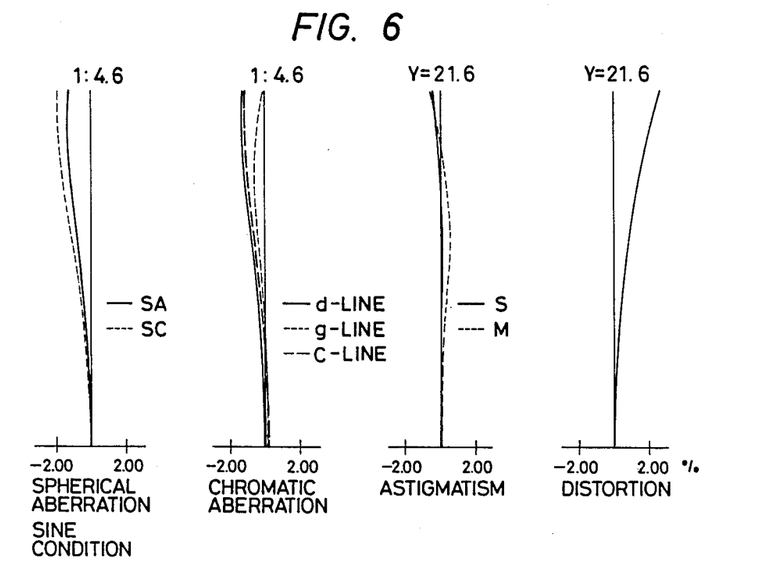
Figure 7:
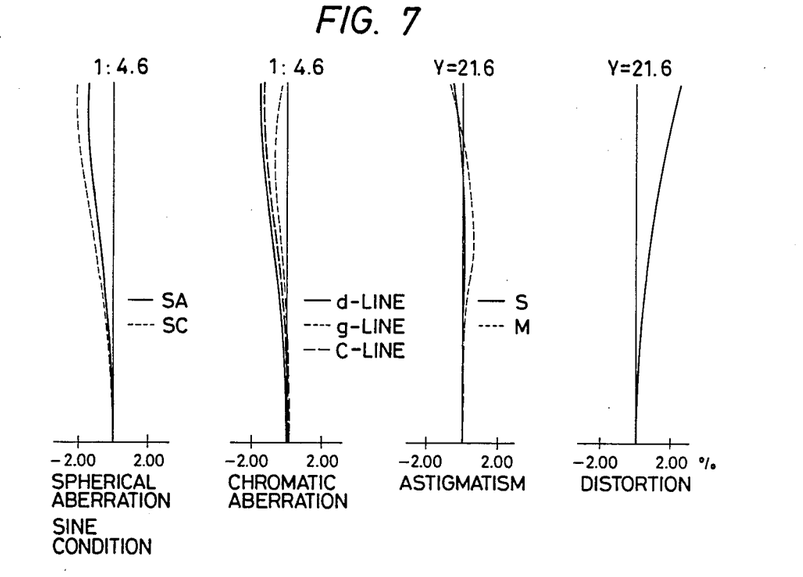
Figure 8:
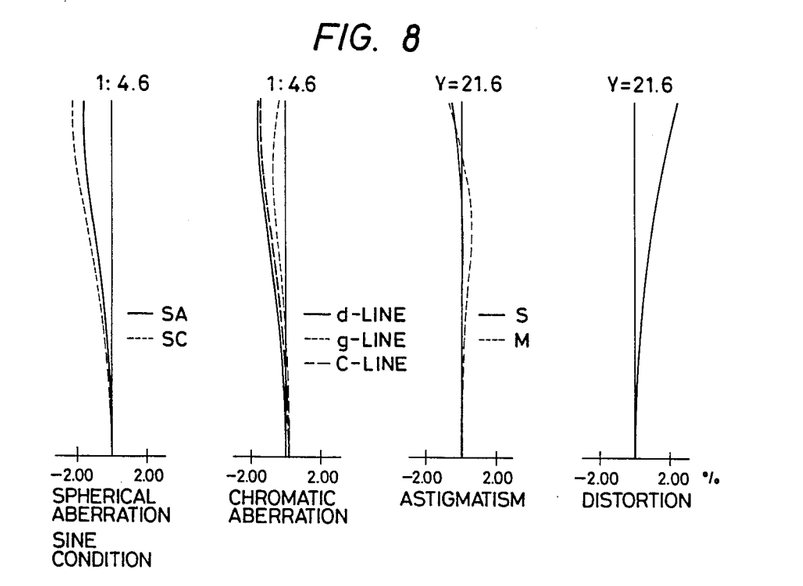

These systems, however, have the following disadvantages:

(i) This is optically the simplest lens system but mechanically it is complex and bulky and the user finds it troublesome to displace all the lens groups which are unpleasantly heavy en masse;

(ii) This is mechanically the simplest lens system but it suffers the disadvantage that the first lens group has to be moved by an unduly large amount and that an undercompensated spherical aberration and an overcompensated field of curvature will develop at a maximum magnification of the image in a macro mode, thereby causing undesirably great aberrational variations (see FIG. 3);

(iii) This system has the advantage that the required amount of lens displacement is small and that it is simple in construction, but it is subject to great deterioration in performance.

OBJECT AND SUMMARY OF THE INVENTION

The present invention has been accomplished in order to solve the aforementioned problems of the prior An object, therefore, of the present invention, is to provide a four-group type macro-adapted zoom lens system capable of high zoom ratio and which covers wide angles while featuring additional advantages such as the need to displace lens groups by only small amounts, a mechanically simple configuration, compactness and good performance.

The present invention attains this and other objects by employing the old method for focusing purposes and improving the macro-adapted system (iii).

DESCRIPTION OF THE PREFERRED EMBODIMENTS

The present invention will now be described.

According to the present invention, in a macroadapted zoom lens system capable of high zoom ratio and which covers wide angles, the lens system comprises, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end. The focusing is normally achieved by means of the first lens group and, when closeup shooting is to be made at a nearer distance, the first lens group is fixed at the telephoto end but the second lens group is displaced toward the object while at least one of the third and fourth lens groups are displaced independently so as to increase the distance between the third and fourth lens groups.

As described above, in a macro-photographing mode, the first lens group is fixed at the telephoto end while the second, third and fourth lens groups are displaced toward the object side independently of each other (in this case, the macro-mode also includes the lens moving system in which one of the third and fourth lens groups is fixed.)

EXAMPLE 1

According to a first example of the invention, the second and third lens groups are moved independently of each other toward the object, while satisfying the following condition:

$$0.1 < X_3/X_2 < 0.4 \tag{1}$$

where
- $X_2$: the amount of displacement of the second lens group;
- $X_3$: the amount of displacement of the third lens group.

In this case, the fourth lens group is fixed during the macro-mode.

If the lower limit of this condition is not reached, the system is essentially equivalent to a system that performs a macro-mode operation solely by means of displacing the second lens group. Under this situation, the undercompensated spherical aberration on the optical axis cannot be effectively corrected and the off-axis curvature of field is considerably under-compensated, accompanied by a large coma aberration. If the upper limit of the condition set forth above is exceeded, the on-axis spherical aberration becomes overcompensated and the off-axis curvature of field becomes even greater than what occurs in the prior art system that permits the first lens group to be advanced for effecting a macro-mode operation.

According to this moving system, effective aberrational compensation can be accomplished both on the optical axis and off-axis by displacing the second and third lens groups in such a way that the amounts of their movement will satisfy the conditions set forth above.

EXAMPLE 2

At the telephoto end, the first and third lens groups are fixed and the second lens group is displaced toward the object independently of the fourth lens group which is displaced in the opposite direction (i.e., toward the image) in such a way that the following condition is satisfied:

$$0.2 < |X_4|/X_2 < 0.5 (X_4 < O) \tag{2}$$

- $X_2$: the amount of displacement of the second lens group
- $X_4$: the amount of displacement of the fourth lens group If the lower limit of condition (2) is not reached, the system is essentially equivalent to a system that performs a macro-mode operation solely by means of displacing the second lens group. Under this situation, the undercompensated spherical aberration on the optical axis cannot be effectively corrected and the off-axis curvature of field is considerably under-compensated, accompanied by a large coma aberration. If the upper limit of condition (2) set forth above is exceeded, the on-axis spherical aberration becomes overcompensated and the off-axis curvature of field becomes even greater than what occurs in the prior art system that permits the first lens group to be advanced for effecting a macro-mode operation.

EXAMPLE 3

At telephoto end, the first lens group is fixed, and the second lens group is displaced toward the object independently of the third and fourth lens groups which are displaced in the opposite direction (i.e., toward the image), with the distance from the third to fourth lens group being increased, in such a way that the following conditions are satisfied:

$$O < |X_3|/X_2 < 0.3 (X_3 < O) \tag{3}$$

$$0.25 < X_{3-4}/X_2 < 0.55 \tag{4}$$

- $X_2$: the amount of displacement of the second lens group
- $X_3$: the amount of displacement of the third lens group
- $X_{3-4}$: the amount of change in the distance between the third and fourth lens groups.

In this method, both the third and fourth lens groups are displaced toward the image. Compared with the fourth and fifth methods (Example 4 and 5) in which the third lens group is displaced toward the object, the third method (Example 3) is a little more advantageous for the purpose of compensating for coma aberration but has the disadvantage of reduced marginal light. If the lower limit of condition (3) is not reached, the second method is no longer valid. If the upper limit of condition (3) is exceeded, a condition results that is favorable for the purpose of compensating for coma aberration but at the same time, the quantity of marginal light is reduced and there is no way to increase the maximum magnification of image that can be attained. If the third lens group is displaced toward the image by an amount that satisfies condition (3), the fourth lens group has to be displaced further toward the image than the third lens group in order to compensate for spherical aberration and off-axis curvature of field and to this end, condition 94) must be satisfied. If the lower limit of this condition is not reached, the spherical aberration and off-axis curvature of field are under-compensated. If the upper limit of condition (4) is exceeded, the two aberrations are overcompensated.

EXAMPLE 4

At the telephoto end, the first lens group is fixed and the second and third lens groups are displaced toward the object independently of each other and of the fourth lens group which is displaced in the opposite direction (i.e., toward the image) away from the third lens group in such a way that the following conditions are satisfied:

$$O < X_3/X_2 < 0.3 \tag{5}$$

$$0.15 < X_{3-4}/X_2 < 0.45 \tag{6}$$

- $X_2$: the amount of displacement of the second lens group
- $X_3$: the amount of displacement of the third lens group
- $X_{3-4}$: the amount of change in the distance between third and fourth lens groups.

In the fourth method, the third and fourth lens groups are displaced in opposite directions and in this respect, the third method is categorically in between the third and fifth methods. If the lower limit of condition (5) is not reached, the third method is no longer valid. If the upper limit of condition (5) is exceeded, the off-axis curvature of field will be overcompensated. If the lower limit of condition (6) is not reached, the off-axis curvature of field is undercompensated. On other hand, if the upper limit of condition (6) is exceeded, over-compensation of the off-axis curvature of field will occur.

EXAMPLE 5

At the narrow-angle end, the first lens group is fixed but the second lens group is displaced toward the object and the third and fourth lens groups are also displaced toward the object independently, with the distance therebetween being increased, in such a way that the following conditions are satisfied:

$$0.2 < X_3/X_2 < 0.5 \tag{7}$$

$$0.05 < X_{3-4}/X_2 < 0.35 \tag{8}$$

$X_2$: the amount of displacement of the second lens group
$X_3$: the amount of displacement of the third lens group
$X_{3-4}$: the amount of change in the distance between the third and fourth lens groups.

The fifth method differs from the third method in that both the third and fourth lens groups are displaced toward the object. Compared with the third method in which the third lens group is displacement toward the image, the fifth method is advantageous for the purpose of ensuring marginal light but disadvantageous for the purpose of compensating for coma aberration. In addition, the second lens group has to be displaced by an increased amount. If the lower limit of condition (7) is not reached, the off-axis curvature of field will become undercompensated. Therefore, in the fifth method, the lower limit of condition (7) must at least be met in order to permit the displacement of the fourth lens group toward the object and yet achieve effective aberrational compensation. If the upper limit of condition (7) is exceeded, coma aberration cannot be effectively compensated and the second lens group has to be displaced by an increased amount. If the lower limit of condition (8) is not reached, the off-axis curvature of field will be undercompensated. If the upper limit of condition (8) is exceeded, overcompensation of the field curvature will occur.

As for the condition that should be met by the distance between the third and fourth lens groups (i.e., condition (2) in the second method, condition (4) in the third method, condition (6) in the fourth method, and condition (8) in the fourth method), either of the methods is adapted to accomplish aberrational compensation by displacing the second lens group in such a way that the distance between the third and fourth lens groups will be increased. For the purpose of effective aberrational compensation, the change in the distance between the third and fourth lens groups is preferably increased when the third lens group is displaced toward the image, and decreased when the third lens group is displaced toward the object.

Four examples of the present invention are hereinafter described with reference to a data sheet of a master lens when it is focused for an object at infinity. In the data sheet that follows, $F_{NO}$ signifies the F-number, f=focal length, m=image magnification in a macro mode, ω=half view angle, $f_B$=back focus, r=the radius of curvature of an individual lens surface, d=lens thickness or the aerial distance between adjacent lenses; N=the refractive index, at the d-line, of an individual lens, and ν=the Abbe number of an individual lens.

In the lens data, symbol A denotes a distance between the first and second lens groups at a minimum normal photographing distance of 1.8 m which is obtained by advancing the first lens group, and symbol B denotes a distance between the first and second lens groups at a macro-magnification m=−¼ in accordance with the first lens group advancing method in which the first lens group is advanced for macro-photographing (in this case, the object/image distance is approximately 0.8 m). Also, the data of the respective examples represent the values which are obtained by changing the modes from the condition of the minimum normal closeup photographing distance of 1.8 mm to the condition of the macro-magnification m=−¼ (at which the object/image distance is approximately 0.5 m).

MASTER LENS DATA
$F_{NO}$ = 1:4.6 f = 132.00 m = 0.0~−¼
ω = 9.0 $f_B$ = 70.23

| No. | r | d | N | ν |
|---|---|---|---|---|
| 1 | 603.179 | 2.30 | 1.80518 | 25.4 |
| 2 | 56.533 | 5.99 | | |
| 3 | 125.548 | 5.18 | 1.58913 | 61.0 |
| 4 | −293.229 | 0.10 | | |
| 5 | 55.238 | 6.97 | 1.77250 | 49.7 |
| | | A     B | | |
| 6 | −371.690 | 36.78~41.30~49.95 | | |
| 7 | 148.723 | 1.60 | 1.83481 | 42.7 |
| 8 | 21.693 | 4.64 | | |
| 9 | −50.900 | 1.50 | 1.71300 | 53.8 |
| 10 | 20.659 | 5.79 | 1.80518 | 25.4 |
| 11 | −52.173 | 0.15 | | |
| 12 | −51.078 | 1.50 | 1.83481 | 42.7 |
| 13 | 193.337 | 3.00 | | |
| 14 | 52.475 | 4.59 | 1.64769 | 33.8 |
| 15 | −46.239 | 1.15 | | |
| 16 | −27.162 | 1.70 | 1.84666 | 23.9 |
| 17 | −169.834 | 0.10 | | |
| 18 | 43.266 | 2.70 | 1.69680 | 55.5 |
| 19 | 117.995 | 1.00 | | |
| 20 | 57.079 | 3.34 | 1.77250 | 49.7 |
| 21 | −709.565 | 0.10 | | |
| 22 | 37.173 | 8.50 | 1.69350 | 53.2 |
| 23 | −38.382 | 2.00 | 1.71736 | 29.5 |
| 24 | −1225.402 | 3.92 | | |
| 25 | 232.987 | 1.70 | 1.83400 | 37.2 |
| 26 | 15.101 | 6.46 | 1.51454 | 54.7 |
| 27 | −101.687 | 0.14 | | |
| 28 | 131.000 | 3.48 | 1.68893 | 31.1 |
| 29 | −35.057 | 1.36 | | |
| 30 | −20.254 | 1.50 | 1.83481 | 42.7 |
| 31 | −84.899 | | | |

DATA OF EXAMPLES OF THE INVENTION

| | $d_6$ | $d_{13}$ | $d_{19}$ | $f_b$ | $X_3/X_2$ | $X_4/X_2$ | $X_{3-4}/X_2$ |
|---|---|---|---|---|---|---|---|
| Example 1 | 32.89 | 9.30 | 3.10 | 70.23 | 0.25 | 0 | 0.25 |
| Example 2 | 34.79 | 9.51 | 3.28 | 67.97 | 0 | −0.35 | 0.35 |
| Example 3 | 35.37 | 9.58 | 3.31 | 67.29 | −0.11 | −0.50 | 0.39 |
| Example 4 | 33.85 | 9.40 | 3.08 | 69.21 | 0.14 | −0.14 | 0.28 |
| Example 5 | 32.25 | 9.24 | 2.90 | 71.15 | 0.31 | 0.10 | 0.21 |

Note: With respect to the amount of displacement of each lens group, + sign means the movement toward the object and − sign means the movement toward the image.

As described in the foregoing, the macro-adapted zoom lens system of the present invention comprises a positive, a negative, a positive and a positive lens group, and this four-lens group configuration is most commonly employed for a zoom lens system that is capable of high zoom ratio and which covers wide angles. According to the present invention, however, closeup shooting is made by fixing the first lens group at the telephoto end while displacing the second, third and fourth lens groups independently of one another (inclusive of the case where the third lens group is fixed). By changing the distance between adjacent lens groups in the manner described above, the following advantages are attained: lenses need to be displaced by very small amounts in order to perform a macro-mode operation; mechanically, the lens system is rather simple and compact; in addition, as is clear from the comparison between FIG. 3 (a system in which the first lens group is advanced in a macro-mode operation) and FIGS. 4-7 (showing systems within the scope of the present invention), effective aberrational compensation can be accomplished to ensure a satisfactory lens performance in a macro-mode operation.

I claim:

1. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end but the second lens group is displaced toward the object while at least the fourth lens group is displaced a distance less than the movement of said second lens group so as to increase the distance between the third and fourth lens groups.

2. The system of claim 1, wherein the second lens group is displaced toward the object independently of the fourth lens group which is displaced toward the image in such a way that he following condition is satisfied:

$$0.2 < |X_4|/X_2 < 0.5 \ (X_4 < O)$$

where
- $X_2$: the amount of displacement of the second lens group; and
- $X_4$: the amount of displacement of the fourth lens group.

3. The system of claim 1, wherein the second lens group is displaced toward the object while the third and fourth lens groups are displaced toward the image in such a way that the following conditions are satisfied:

$$0 < |X_3|/X_2 < 0.3 \ (X_3 < O)$$

$$0.25 < X_{3\text{-}4}/X_2 < 0.55$$

where
- $X_2$: the amount of displacement of the second lens group;
- $X_3$: the amount of displacement of the third lens group; and
- $X_{3\text{-}4}$: the amount of change in the distance between the third and fourth lens groups.

4. The system of claim 1, wherein the second and third lens groups are displaced toward the object, and the fourth lens group is displaced toward the image, so that the following conditions are satisfied:

$$O < X_3/X_2 < 0.3$$

$$0.15 < X_{3\text{-}4}/X_2 < 0.45$$

where
- $X_2$: the amount of displacement of the second lens group;
- $X_3$: the amount of displacement of the third lens group; and
- $X_{3\text{-}4}$: the amount of change in distance between the third and fourth lens groups.

5. The system of claim 1, wherein the second lens group is displaced toward the object and the third and fourth lens groups are also displaced toward the object, in such a way that the following conditions are satisfied:

$$0.2 < X_3/X_2 < 0.5$$

$$0.05 < X_{3\text{-}4}/X_2 < 0.35$$

where
- $X_2$: the amount of displacement of the second lens group;
- $X_3$: the amount of displacement of the third lens group; and
- $X_{3\text{-}4}$: the amount of change in the distance between third and fourth lens groups.

6. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens group being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second lens group is displaced toward the object, and the fourth lens group is displaced toward the image in such a way that he following condition is satisfied:

$$0.2 < |X_4|/X_2 < 0.5 (X_4 < O)$$

where
- $X_2$: the amount of displacement of the second lens group; and
- $X_4$: the amount of displacement of the fourth lens group.

7. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second lens group is displaced toward the object and the third and fourth lens groups are displaced toward the image in such a way that the following conditions are satisfied:

$$0 < |X_3|/X_2 < 0.3 (X_3 < 0)$$

$$0.25 < X_{3-4}/X_2 < 0.55$$

where
- $X_2$: the amount of displacement of the second lens group;
- $X_3$: the amount of displacement of the third lens group; and
- $X_{3-4}$: the amount of change in distance between the third and fourth lens groups.

8. In a macro-adapted zoom lens system capable of high zoom ratio and which covers wise angles, said lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second and third lens groups are displaced toward the object independently of each other and of the fourth lens group which is displaced in the opposite direction so that the following conditions are satisfied:

$$0 < X_3/X_2 < 0.3$$

$$0.15 < X_{3-4}/X_2 < 0.45$$

where
- $X_2$: the amount of displacement of the second lens group;
- $X_3$: the amount of displacement of the third lens group; and
- $X_{3-4}$: the amount of change in the distance between the third and fourth lens groups.

9. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing all of the four lens groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end while the second lens group is displaced toward the object and the third and fourth lens groups are also displaced toward the object in such a way that the following conditions are satisfied:

$$0.2 < X_3/X_2 < 0.5$$

$$0.05 < X_{3-4}/X_2 < 0.35$$

where
- $X_2$: the amount of displacement of the second lens group;
- $X_3$: the amount of displacement of the third lens group; and
- $X_{3-4}$: the amount of change in distance between the third and fourth lens groups.

10. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing at least the first, third and fourth groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end but the second lens group is displaced toward the object while at least one fourth lens group is displaced a distance less than the movement of said second lens so as to increase the distance between the third and fourth lens groups.

11. The system of claim 10, wherein the second lens group is displaced toward the object, and the fourth lens group is displaced toward the image in such a way that the following condition is satisfied:

$$0.2 < |X_4|/X_2 < 0.5 (X_4 < 0)$$

where
- $X_2$: the amount of displacement of the second lens group; and
- $X_4$: the amount of displacement of the fourth lens group.

12. The system of claim 10, wherein the second lens group is displaced toward the object, and the third and fourth lens groups are displaced toward the image in such a way that the following are satisfied:

$$0 < |X_3|/X_2 < 0.3 (X_3 < O)$$

where
- $X_2$: the amount of displacement of the second lens group;
- $X_3$: the amount of displacement of the third lens group; and
- $X_{3\text{-}4}$: the amount of change in the distance between the third and fourth lens groups.

13. The system of claim 10, wherein the second and third lens groups are displaced toward the object, and the fourth lens group is displaced toward the image, so that the following conditions are satisfied:

$$0 < X_3/X_2 < 0.3$$

$$0.15 < X_{3\text{-}4}/X_2 < 0.45$$

where
- $X_2$: the amount of displacement of the second lens group;
- $X_3$: the amount of displacement of the third lens group; and
- $X_{3\text{-}4}$: the amount of change in distance between the third and fourth lens groups.

14. The system of claim 10, wherein the second lens group is displaced toward the object and the third and fourth lens groups are also displaced toward the object in such a way that the following conditions are satisfied:

$$0.2 < X_3/X_2 < 0.5$$

$$0.05 < X_{3\text{-}4}/X_2 < 0.35$$

where
- $X_2$: the amount of displacement of the second lens group;
- $X_3$: the amount of displacement of the third lens group; and
- $X_{3\text{-}4}$: the amount of change in distance between the third and fourth lens groups.

15. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing at least the first, third and fourth groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second lens group is displaced toward the object and the fourth lens group is displaced toward the image in such a way that the following condition is satisfied:

$$0.2 < |X_4|/X_2 < 0.5 (X_4 < O)$$

wherein
- $X_2$: the amount of displacement of the second lens group; and
- $X_4$: the amount of displacement of the fourth lens group.

16. In a macro-adapted zoom lens capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing at least the first, third and fourth groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end that at the wide-angle end, the improvement wherein focusing is normally achieved by means of the first lens group and, when closeup shooting is to be made at a nearer distance, the first lens group is fixed at the telephoto end, wherein the second lens group is displaced toward the object, and the third and fourth lens groups are displaced toward the image in such a way that the following conditions are satisfied:

$$0 < |X_3|/X_2 < 0.3 (X_3 < O)$$

$$0.25 < X_{3\text{-}4}/X_2 < 0.55$$

where
- $X_2$: the amount of displacement of the second lens group;
- $X_3$: the amount of displacement of the third lens group; and
- $X_{3\text{-}4}$: the amount of change in the distance between the third and fourth lens groups.

17. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing at least the first, third and fourth groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second and third lens groups are displaced toward the object, and the fourth lens group is displaced toward the image in such a way that the following conditions are satisfied:

$$0 < X_3/X_2 < 0.3$$

$$0.15 < X_{3-4}/X_2 < 0.45$$

where
- $X_2$: the amount of displacement of the second lens group;
- $X_3$: the amount of displacement of the third lens group; and
- $X_{3-4}$: the amount of change in the distance between the third and fourth lens groups.

18. In a macro-adapted zoom lens system capable of high zoom ratio and which covers wide angles, said lens system comprising, in order from the object side, a first lens group having a positive focal length, a second lens group having a negative focal length, a third lens group having a positive focal length, and a fourth lens group having a positive focal length, the focal length of the overall system being varied by displacing at least the first, third and fourth groups, and when zooming is effected by shifting the system from a wide-angle end to a telephoto end, a distance between the first and second lens groups being increased while a distance between the second and third lens groups and a distance between the third and fourth lens groups are decreased, with the first and fourth lens groups being situated closer to the object at the telephoto end than at the wide-angle end, the improvement wherein focusing is normally achieved by means of the first lens group and, when closeup shooting is to be made at a nearer distance, the first lens group is fixed at the telephoto end, wherein the second lens group is displaced toward the object and the third and fourth lens groups are also displaced toward the object, in such a way that the following conditions are satisfied:

$$0.2 < X_3/X_2 < 0.5$$

$$0.05 < X_{3-4}/X_2 < 0.35$$

where
- $X_2$: the amount of displacement of the second lens group;
- $X_3$: the amount of displacement of the third lens group; and
- $X_{3-4}$: the amount of change in distance between the third and fourth lens groups.

* * * * *